United States Patent
Geise et al.

[11] Patent Number: 6,135,541
[45] Date of Patent: Oct. 24, 2000

[54] AUTOMOBILE DOOR TO PROVIDE HIGH-QUALITY CLOSING SOUND

[75] Inventors: Lawrence Geise, Columbus; C. Todd Walker, Hilliard; Daniel P. Harless, Columbus; Jun Nakamura, Upper Arlington, all of Ohio

[73] Assignee: Honda Giken Kogyo Kabushiki Kaisha, Tokyo, Japan

[21] Appl. No.: 09/133,653

[22] Filed: Aug. 12, 1998

[51] Int. Cl.[7] ............................................. B60J 5/04
[52] U.S. Cl. .................................. 296/188; 296/146.6
[58] Field of Search ........................... 296/188, 146.6, 296/146.5, 189; 49/502

[56] References Cited

U.S. PATENT DOCUMENTS

| | | | |
|---|---|---|---|
| 4,969,680 | 11/1990 | Shimoda | 296/146 |
| 5,080,427 | 1/1992 | Sturrus et al. | 296/146.6 X |
| 5,404,690 | 4/1995 | Hanf | 296/146.6 X |
| 5,553,910 | 9/1996 | Park | 296/146.6 X |
| 5,820,202 | 10/1998 | Ju | 296/188 X |
| 5,857,734 | 1/1999 | Okamura et al. | 296/146.6 X |
| 6,039,387 | 3/2000 | Choi | 296/188 |

FOREIGN PATENT DOCUMENTS

| | | | |
|---|---|---|---|
| 4-300715 | 10/1992 | Japan | 296/146.6 |
| 4-300716 | 10/1992 | Japan | 296/146.6 |

*Primary Examiner*—D. Glenn Dayoan
*Assistant Examiner*—Jason Morrow
*Attorney, Agent, or Firm*—Morgan & Finnegan, L.L.P.

[57] ABSTRACT

An acoustic vibration damping system for a car door utilizes the side impact beam and connects intermediate areas of the beam to the inside of the outer skin by way of at least one intermediate bracket to shorten vibration distances. An absorbing adhesive is used in the connection.

11 Claims, 1 Drawing Sheet

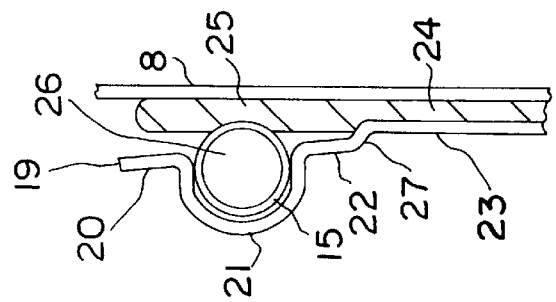
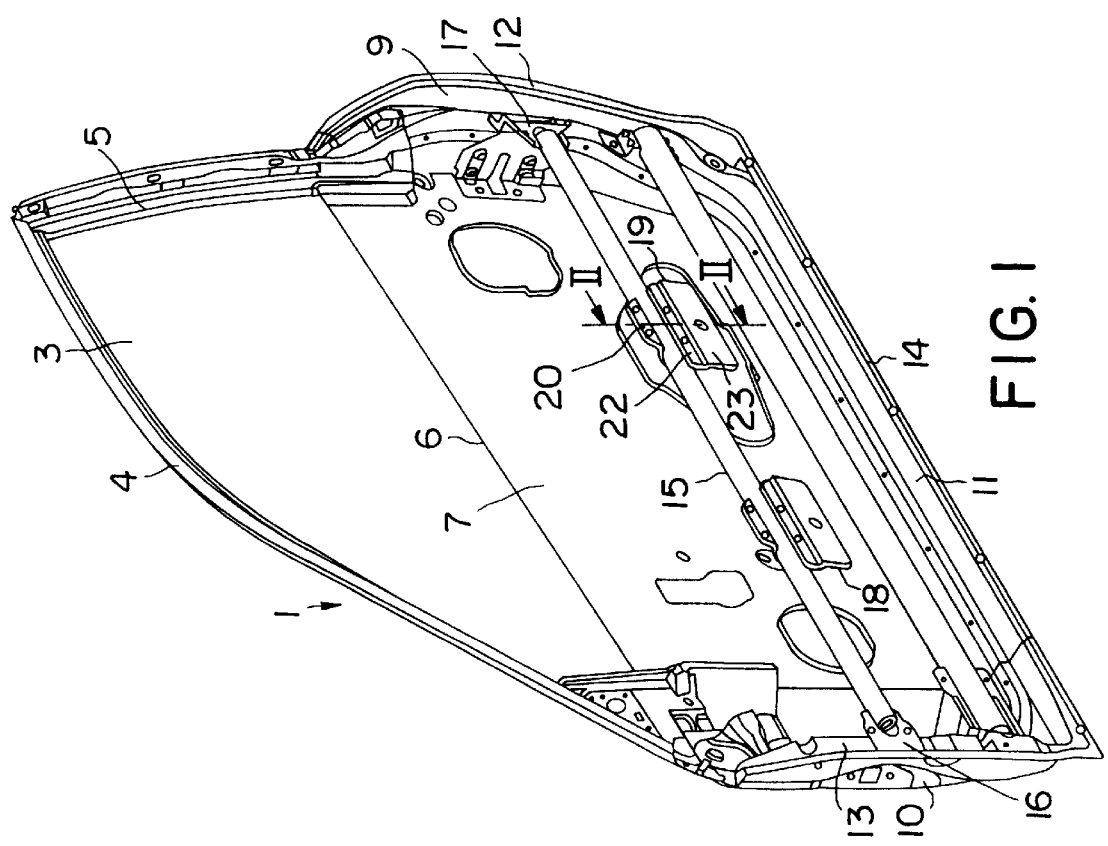

AUTOMOBILE DOOR TO PROVIDE HIGH-QUALITY CLOSING SOUND

BACKGROUND OF THE INVENTION

1. Field of the Invention

The invention relates to the field of car door construction. More in particular, the invention relates to systems for tuning and damping acoustic vibrations in car doors.

2. Description of the Related Art

Car customers are attracted to quality car build. One of the universal tests they use to determine quality is to listen to the sound a car door makes when it is closed. If the sound reverberates, or is "tinny", or sounds like a drum, the quality of the car is perceived as poor. However, if the sound is "solid", e.g., it lacks reverberation, the quality of the car is deemed high. Thus, the sound a car door makes when it is closed is often important in making a sale.

The problem of low quality sounding car doors arises from the fact that car doors are hollow. The typical car door below the window opening has an outer skin and an inner panel. There is a significant space between the two in which are located such things as structure for raising and lowering the window glass, and for door latching. Typically, such internal structure is attached to the inner panel or the rear latch area of the door. The outer skin typically does not have anything mechanically attached to it so the outer appearance of the door will appear uninterrupted. Accordingly, the outer skin acts like a drum skin and vibrates unwanted acoustic waves along the length and width of the door, as well as across the internal space.

Car doors are now required to have a side impact structure installed in the interior of the door which extends along the length of the door. The purpose of the impact structure is to absorb crash impact from the side and protect passengers seated adjacent to the doors. These structures are usually beams but have had little effect, if any, in damping unwanted acoustic vibrations in the doors.

Side impact beams can take various shapes. U.S. Pat. No. 5,080,427 to Sturrus et al. discloses a roll-formed impact beam which can be attached to the outer skin or inner panel by fasteners or adhesives.

Another, more substantial side impact structure is shown in U.S. Pat. No. 4,969,680 to Shimoda. Here the side impact structure is a panel consisting of two corrugated plates attached to each other with the ridges and grooves of the respective corrugations confronting each other. The panel extends the horizontal length of the door. Vertically, the panel extends from the outer skin in an upper region near the window opening to the inner panel at the bottom where it is spot welded in place. The use of brackets is not disclosed. Shimoda discloses that the panel may double as the outer skin or may be covered by a decorative outer skin with some clearance therebetween. There is no discussion concerning damping acoustic vibrations.

A beam held in place by brackets on the inner panel is shown in U.S. Pat. No. 5,404,690 to Hanf. A beam is disclosed which extends the horizontal length of the door. The beam is crimped on the ends to provide a mounting area for end brackets to connect the beam ends to the inner panel. A center bracket mounted on the inner panel fixes the beam at its mid-section. There is no disclosure by Hanf of utilizing the beam or its brackets to dampen the acoustic vibration of the outer skin.

Accordingly, there is a need in the art for systems to truncate and dampen sound waves traveling through the outer skin of a door so as to provide a high quality closing sound.

SUMMARY OF THE INVENTION

An acoustic vibration damping system for a car door has a beam extending through the interior space between the inner panel and outer skin. The beam is connected by its ends to the car door. There is at least one bracket which has a portion attached to the beam at a point intermediate of the lateral edges and another portion which is attached to the inner side of the outer skin. Preferably, the attachment is by an adhesive material. The placement of the bracket on the outer skin serves to divide the outer skin into two distinct, shorter vibration spans which serves to raise the pitch of the sound waves. The use of an adhesive material avoids interrupting the outer side of the outer skin and dampens the vibrations. It is preferred that the beam have sufficient mass and strength to function as a side impact beam and absorb crash impact.

It is preferred that the first portion of the bracket conforms in shape to at least a section of the beam to capture a length of the beam. For example, the beam may be tubular or cylindrical so the first portion of the bracket should be curved to wrap around the backside of the beam and hold the beam in close relation to the inner side of the outer skin. It is also preferred that the second portion of the bracket be shaped for attachment to a correspondingly shaped area on the inner side of the outer skin.

The car door can be made to sound even more solid if a second bracket is attached to the beam at a point intermediate the first bracket and a lateral edge. This second bracket should be configured and attached to the inner side of the outer skin in the same way as the first bracket. The outer skin is thus separated into several short vibration spans which provide the closing door with a higher pitch and additional damping. Thus, the invention tunes the sound of the closing door by raising and muting the pitch.

BRIEF DESCRIPTION OF THE DRAWINGS

FIG. 1 is an elevated perspective of a car door viewed from the outside wherein the outer skin has been removed for purposes of illustration.

FIG. 2 is a cross-sectional view of the bracket, beam and outer skin taken along line II—II of FIG. 1.

DETAILED DESCRIPTION OF THE PREFERRED EMBODIMENTS OF THE PRESENT INVENTION

Acoustic waves propagate along the outer skin of a car door and reverberate through the door interior when the door is closed. The outer skin acts like a sound board or the skin of a drum. The invention is directed to shortening the waves and thus, changing their pitch, as well as to dampening the waves. This is performed by brackets connecting the side impact beams to the inside of the outer skins.

Referring to FIG. 1, a car door 1 is shown in perspective without the outer skin 8 (shown in FIG. 2) and without other structures, such as the window apparatus so the invention is not obscured. The car door example shown in FIG. 1 is the driver's side door of a left hand drive coupe. It should be noted here, at the outset, that the invention is useful for tuning any car or truck door, front or back, on any coupe, roadster or sedan.

Referring to FIG. 1, the car door 1 has a window opening 3 framed by top window track 4, rear window track 5, and top edge 6 of inner panel 7. The outer skin 8, shown in FIG. 2, also provides the bottom frame for the window opening 3.

The body of door 1 consists of inner panel 7, outer skin 8, rear end panel 9, front end panel 10, and floor 11. Outer skin 8 is attached to the door along rear end edge 12, front end edge 13, and floor edge 14. With the outer skin attached, it should be readily apparent that the body of the door has a substantially hollow interior which acts as an acoustic chamber with the outer skin acting as a sounding board or drum skin.

The side impact beam 15 is disposed in the door interior and extends the horizontal length of the door from the front end panel 10 to the rear end panel 9. The beam is located between the inner panel top edge 6 and floor 11. (The height of the beam from the ground will vary from vehicle to vehicle.) The beam 3 is connected to the interior of the car door on the rear and front end panels, 9, 10, by way of end brackets 16, 17. The side impact beam 15 is also connected to the inside of the outer skin 8 by way of the intermediate brackets 18, 19. The beam should be of sufficient mass and strength to enable it to absorb the requisite amount of crash impact, the details of which are well known to those of ordinary skill in the art.

Acoustic waves transmitted along the outer skin 8 are shortened by brackets 18 and 19. The number of brackets used in the invention is subject to variance depending upon the specific dimensions of the door. Only one of the brackets will be described in detail herein. It will be readily apparent to those skilled in the art who have read this specification that the configuration of the bracket may be changed in accordance with different degrees of tuning.

Referring to FIG. 2, bracket 19 is shown in a cross-sectional view. Beam 15 is shown as a cylindrically shaped tube with a hollow space 26. Bracket 19 has a vertically oriented flat upper section 20 extending upwardly from curved section 21. The curved section 21 is shown partially enclosing the back side of beam 15, i.e., the side facing the inner panel 7. Descending from the curved section 21 is vertically oriented flat section 22 which is coplanar to the upper bracket section 20. The lowest section 23 of bracket 19 is vertically oriented and flat and is disposed towards outer skin 8 by way of the offset section 27.

The shape of the bracket 19 allows the beam 15 to be captured from its backside and held adjacent the inner side of outer skin 8. The front side of beam 15 is prevented from interfering with the connection to the outer skin 8 by way of offset 27.

The connection of bracket 19 to panel 8 shortens the length of vibrations traveling through the outer skin. The bracket 19 can be connected to beam 15 by mechanical connections such as by fasteners, an interference fit or by an adhesive. It is preferred that the bracket 19 be connected to panel 8 by a shock absorbing adhesive 24. The bracket need only be connected to the panel 8 along section 23 of the bracket; however, more damping will occur if adhesive 25 is used, as shown in FIG. 2, wherein the front side of the beam is connected to panel 8 by the adhesive 25.

The specific type of adhesive used in the invention is not deemed critical. Those of ordinary skill in the art will recognize after reading this specification that numerous adhesives used by the automotive industry are sufficient. Care must be taken to ensure that adhesives which attach metal to metal are used when the bracket and the door skin are metal. Other adhesives will be appropriate depending on the nature of the materials being connected. Further, depending upon the degree of tuning involved, such other factors as elasticity and density of the cured adhesive should be considered when establishing a high-quality closing sound.

In operation, as the car door is closed, acoustic vibrations are transmitted to the outer skin 8 from across the interior chamber and from car contacting surfaces, such as those located at rear end panel 9. Acoustic waves reciprocate along the outer skin 8. The bracket 19 shortens the length of reciprocation, effectively splitting the wave in two, wherein one wave is transmitted between bracket 19 and rear panel 9 and the other wave is transmitted between bracket 19 and front end panel 10 or bracket 18, if a second bracket is deployed. With two brackets, a third acoustic vibration span is created between bracket 18 and front end panel 10. The shortened vibration spans provide a higher pitch to the acoustics. The adhesive, together with the bracket and beam, mutes and dampens the vibrations effectively decreasing the sustain of the wave.

While the invention has been described in detail, the description is for purposes of illustration only. It is recognized that those skilled in the art may make modifications to the invention without departing from the essence and spirit hereof. The scope of the invention is set out in the following claims.

What is claimed is:

1. An acoustic vibration damping system for a door of a motor vehicle, comprising:

a car door having a mutually spaced outer skin and inner panel defining a space therebetween, front and rear ends, a top edge, and a floor;

a beam extending through said space between said front and rear ends, said beam being connected to said car door at said front and rear ends, said beam further having a front side facing an inner side of said outer skin and a back side facing an inner side of said inner panel, wherein the beam is cylindrical in shape;

a bracket attached to said beam at a first point intermediate of said front and rear ends, said bracket having a first portion and a second portion, said first portion substantially conforming in shape to and being attached to said backside of said beam, said second portion being attached to said inner side of said outer skin of said door, said bracket being positioned so as to divide said outer skin into two shorter vibration spans to increase pitch of vibrations associated with closing said door.

2. The acoustic vibration damping system of claim 1 wherein the beam is of sufficient mass and strength to absorb crash impact.

3. An acoustic vibration damping system for a door of a motor vehicle, comprising:

a car door having a mutually spaced outer skin and inner panel defining a space therebetween, front and rear ends, a top edge, and a floor;

a beam extending through said space between said front and rear ends, said beam being connected to said car door at said front and rear ends, said beam further having a front side facing an inner side of said outer skin and a back side facing an inner side of said inner panel;

a first bracket attached to said beam at a first point intermediate of said front and rear ends, said first bracket having a first portion and a second portion, said first portion substantially conforming in shape to and being attached to said backside of said beam, said second portion being attached to said inner side of said outer skin of said door, said first bracket being positioned so as to divide said outer skin into two shorter vibration spans to increase pitch of vibrations associated with closing said door;

a second bracket attached to said beam at a second point intermediate of said front and rear ends, said second bracket having a first portion and a second portion, said first portion substantially conforming in shape to and being attached to said backside of said beam, said second portion being attached to said inner side of said outer skin of said door, said second bracket being positioned remote of said first bracket so as to divide said outer skin into three shorter vibration spans to increase pitch of vibrations associated with closing said door.

4. The acoustic vibration damping system of claim 3 wherein said first and second brackets are each connected to said inner side of said outer skin of said door by an adhesive layer.

5. The acoustic vibration damping system of claim 4 wherein said adhesive layer comprises:

a high-density, elastic, shock-absorbing adhesive attaching said second portion of each of said first bracket and said second bracket to said inner side of said outer skin of said door.

6. The acoustic vibration damping system of claim 5 wherein said adhesive layer further attaches a portion of said front side of said beam to said inner side of said outer skin of said door, thereby resulting in greater damping.

7. The acoustic vibration damping system of claim 3 wherein said first bracket is connected to said inner side of said outer skin of said door by an adhesive layer.

8. The acoustic vibration damping system of claim 7 wherein said adhesive layer comprises:

a high-density, elastic, shock-absorbing adhesive attaching said second portion of said first bracket to said inner side of said outer skin of said door.

9. The acoustic vibration damping system of claim 8 wherein said adhesive layer further attaches a portion of said front side of said beam to said inner side of said outer skin of said door, thereby resulting in greater damping.

10. An acoustic vibration damping system for a door of a motor vehicle, comprising:

a car door having a mutually spaced outer skin and inner panel defining a space therebetween, front and rear ends, a top edge, and a floor;

a beam extending through said space between said front and rear ends, said beam being connected to said car door at said front and rear ends by end brackets, said beam further having a front side facing an inner side of said outer skin and a back side facing an inner side of said inner panel;

a first bracket attached to said beam at a first point intermediate of said front and rear ends, said first bracket having a first portion and a second portion, said first portion substantially conforming in shape to and being attached to said backside of said beam, said second portion being attached to said inner side of said outer skin of said door;

a second bracket attached to said beam at a second point intermediate of said front and rear ends, said second bracket having a first portion and a second portion, said first portion substantially conforming in shape to and being attached to said backside of said beam, said second portion being attached to said inner side of said outer skin of said door, said first and second brackets being positioned remote of said first bracket so as to divide said outer skin into three shorter vibration spans to increase pitch of vibrations associated with closing said door; and an adhesive layer connecting each of said first and second brackets to said inner side of said outer skin of said door, said adhesive layer comprising a high-density, elastic, shock-absorbing adhesive attaching said second portion of each of said first bracket and said second bracket to said inner side of said outer skin of said door, said adhesive layer also attaching a portion of said front side of said beam to said inner side of said outer skin of said door, thereby resulting in greater damping.

11. An acoustic vibration damping system for a door of a motor vehicle, comprising:

a car door having a mutually spaced outer skin and inner panel defining a space therebetween, front and rear ends, a top edge, and a floor;

a beam extending through said space between said front and rear ends, said beam being connected to said car door at said front and rear ends by end brackets, said beam further having a front side facing an inner side of said outer skin and a back side facing an inner side of said inner panel, wherein the beam is cylindrical in shape;

a bracket attached to said beam at a point intermediate of said front and rear ends, said bracket having a first portion and a second portion, said first portion substantially conforming in shape to and being attached to said backside of said beam, said second portion being attached to said inner side of said outer skin of said door, said bracket being positioned so as to divide said outer skin into two shorter vibration spans to increase pitch of vibrations associated with closing said door;

an adhesive layer connecting said bracket to said inner side of said outer skin of said door, said adhesive layer comprising a high-density, elastic, shock-absorbing adhesive attaching said second portion of said bracket to said inner side of said outer skin of said door, said adhesive layer also attaching a portion of said front side of said beam to said inner side of said outer skin of said door, thereby resulting in greater damping.

* * * * *